United States Patent
Erbacher

(10) Patent No.: US 6,880,762 B2
(45) Date of Patent: Apr. 19, 2005

(54) HEATER FOR A MOTOR AIR CONDITIONING SYSTEM COMPRISING AT LEAST ONE HEAT PIPE

(75) Inventor: Frank Erbacher, Starnberg (JP)

(73) Assignee: Webasto Thermosysteme International GmbH, Stockdorf (DE)

( * ) Notice: Subject to any disclaimer, the term of this patent is extended or adjusted under 35 U.S.C. 154(b) by 51 days.

(21) Appl. No.: 10/451,921
(22) PCT Filed: Nov. 16, 2002
(86) PCT No.: PCT/EP02/12872
§ 371 (c)(1),
(2), (4) Date: Jun. 27, 2003
(87) PCT Pub. No.: WO03/043842
PCT Pub. Date: May 30, 2003

(65) Prior Publication Data
US 2004/0050943 A1 Mar. 18, 2004

(30) Foreign Application Priority Data
Nov. 23, 2001 (DE) .................. 101 57 446

(51) Int. Cl.⁷ .............................. B60H 1/02
(52) U.S. Cl. .................... 237/12.3 B; 165/41
(58) Field of Search .............. 237/12.3 B, 12.3 R; 219/202

(56) References Cited

U.S. PATENT DOCUMENTS

| | | | | |
|---|---|---|---|---|
| 2,266,216 A | * | 12/1941 | Kimberlin ................. 392/489 |
| 3,626,148 A | * | 12/1971 | Woytowich et al. ........ 219/208 |
| 3,969,605 A | * | 7/1976 | Danell ..................... 219/208 |
| 4,208,570 A | * | 6/1980 | Rynard .................... 219/208 |
| 4,448,242 A | | 5/1984 | Andres et al. |
| 4,562,957 A | * | 1/1986 | Nakagawa et al. .... 237/12.3 R |
| 4,963,716 A | * | 10/1990 | Van Den Elst et al. ..... 219/202 |
| 5,299,631 A | * | 4/1994 | Dauvergne ................. 165/204 |
| 5,408,960 A | * | 4/1995 | Woytowich ......... 123/142.5 E |
| 5,749,412 A | | 5/1998 | Balthazard |
| 6,037,567 A | * | 3/2000 | Inoue et al. .............. 219/202 |
| 6,093,909 A | * | 7/2000 | Beetz et al. ............... 219/208 |
| 6,581,678 B1 | * | 6/2003 | Groemmer et al. ........... 165/42 |
| 6,595,432 B1 | * | 7/2003 | Stemmler et al. ...... 237/12.3 B |

FOREIGN PATENT DOCUMENTS

| | | |
|---|---|---|
| DE | 31 43 334 A1 | 5/1983 |
| DE | 40 14 501 A1 | 11/1991 |
| DE | 197 43 427 A1 | 4/1999 |
| DE | 199 11 547 A1 | 9/2000 |
| EP | 0 243 077 A2 | 10/1987 |
| EP | 1 054 313 B1 | 11/2000 |
| FR | 2 709 816 | 3/1995 |
| JP | 63-265752 | 11/1988 |

* cited by examiner

Primary Examiner—Derek S. Boles
(74) Attorney, Agent, or Firm—Nixon Peabody LLP; David S. Safran

(57) ABSTRACT

The heater (30) is designed for a motor vehicle air conditioning system (10) and has at least one heat exchanger tube (58) which produces a heat conducting connection (54) between a heat generating means (52) and at least one heat releasing means (56) via a medium which vaporizes and condenses in the heat exchanger tube (58). In order to be able to produce the heater (30) more economically, the heat generating means (52) is made with an extruded profile (62, 84) to which at least one heat exchanger tube (58) is coupled by heat conduction.

32 Claims, 6 Drawing Sheets

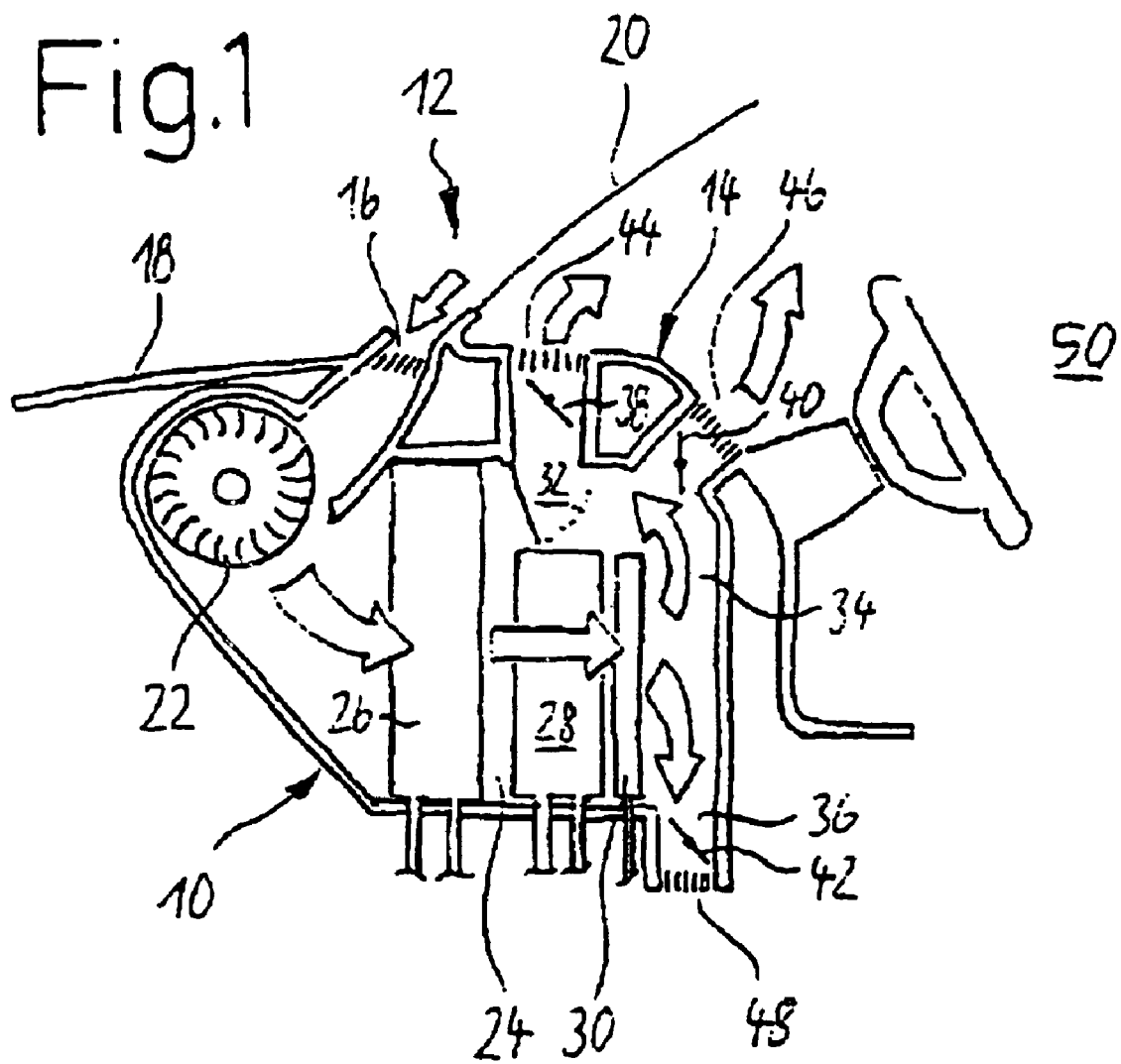

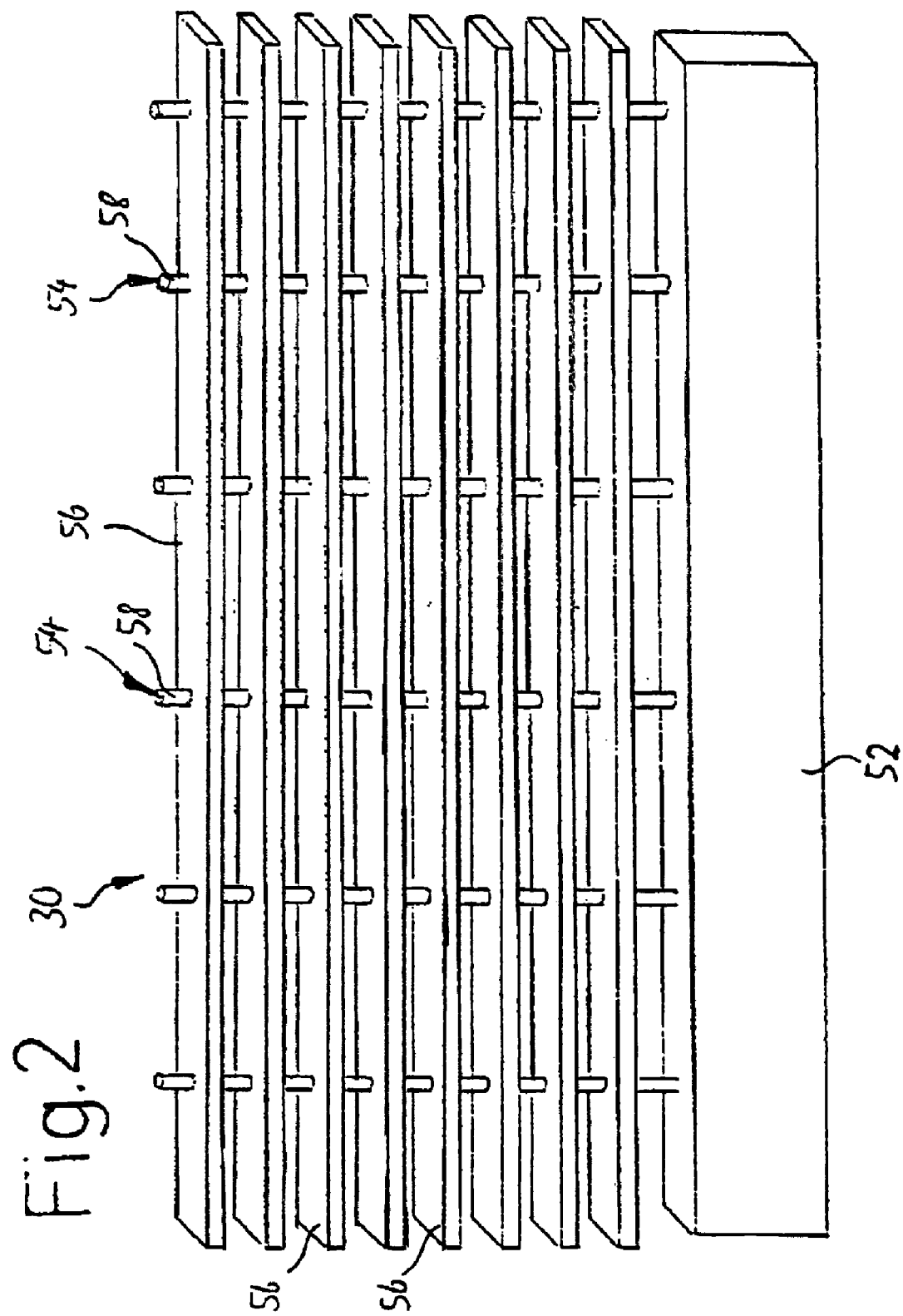

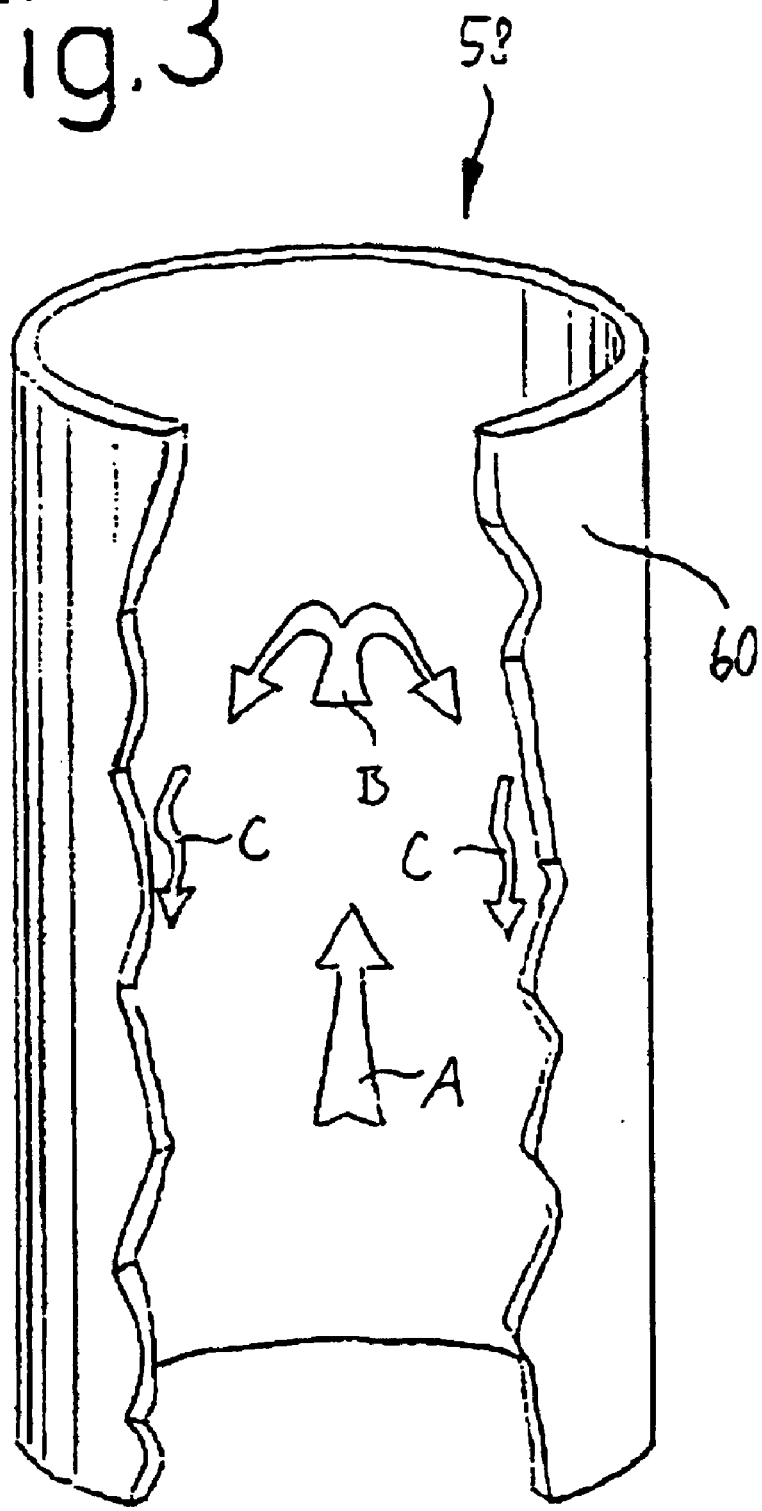

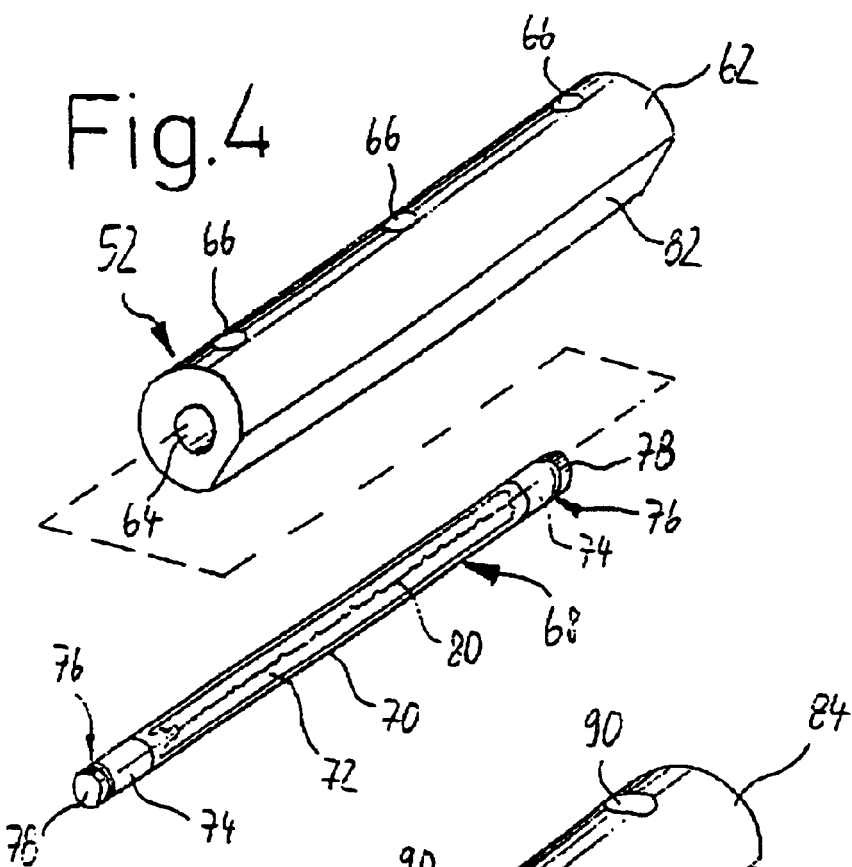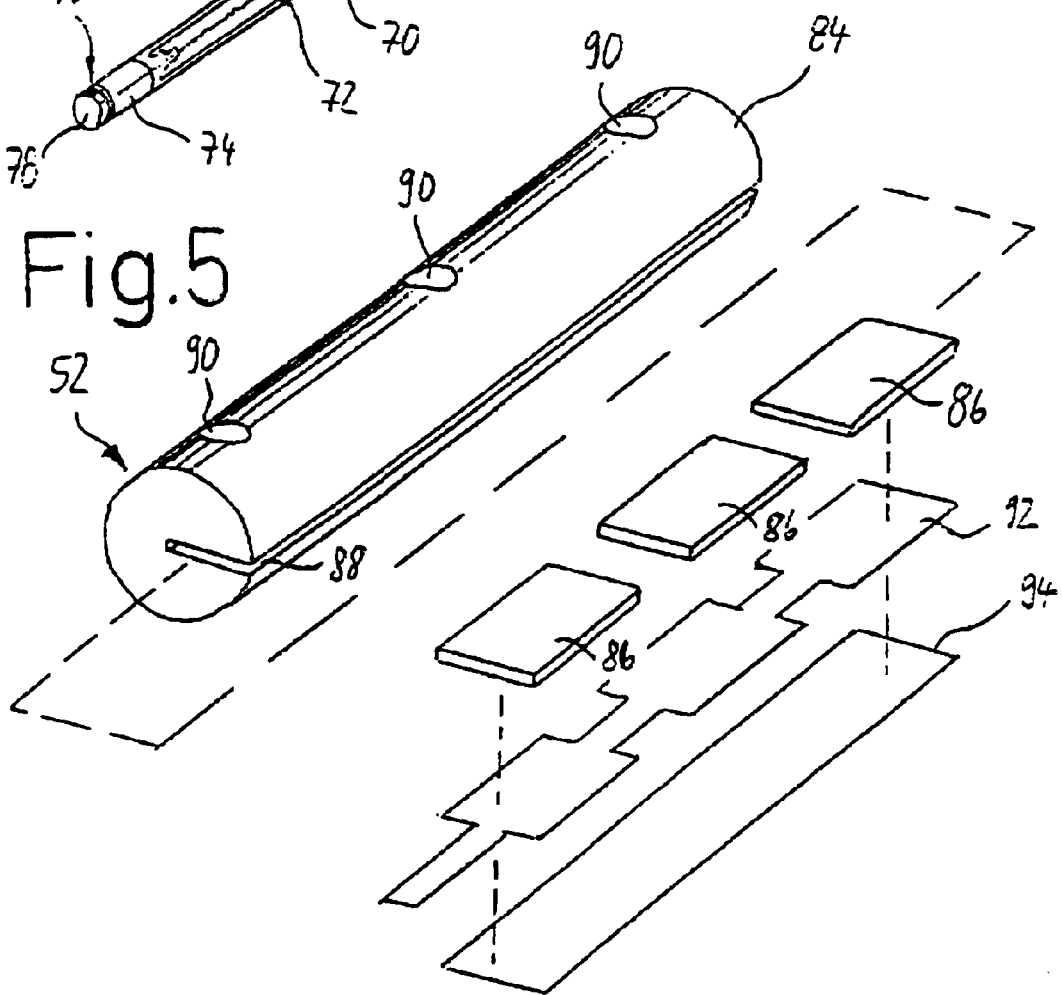

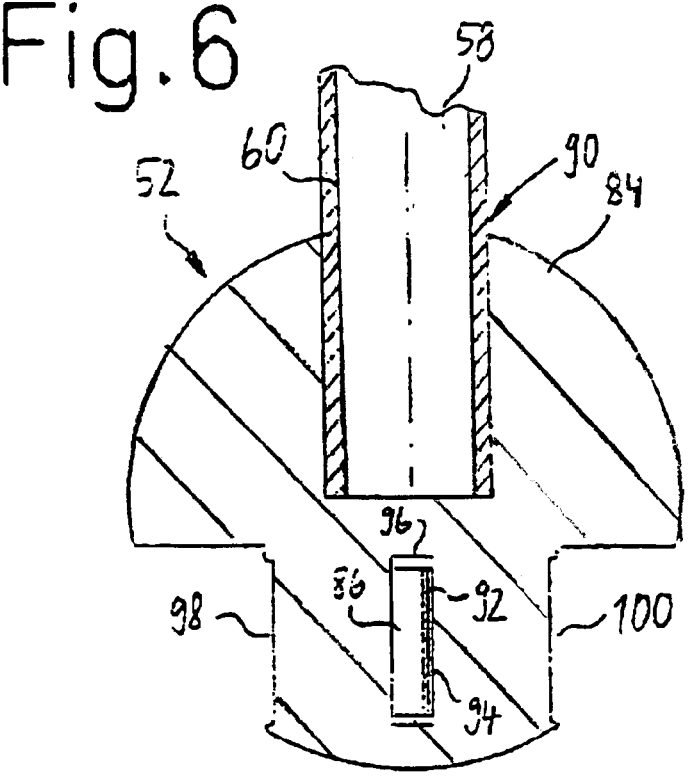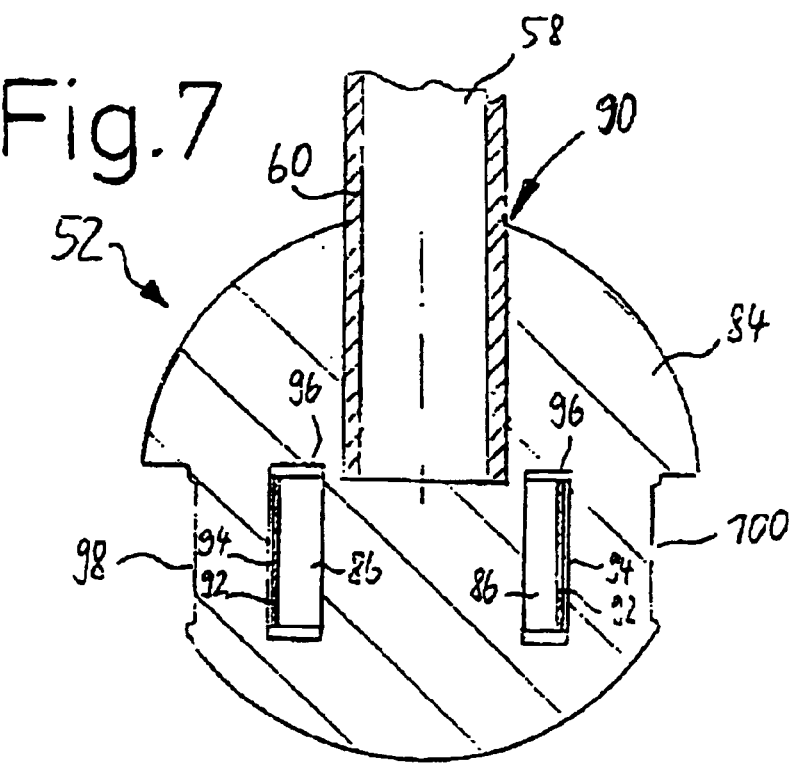

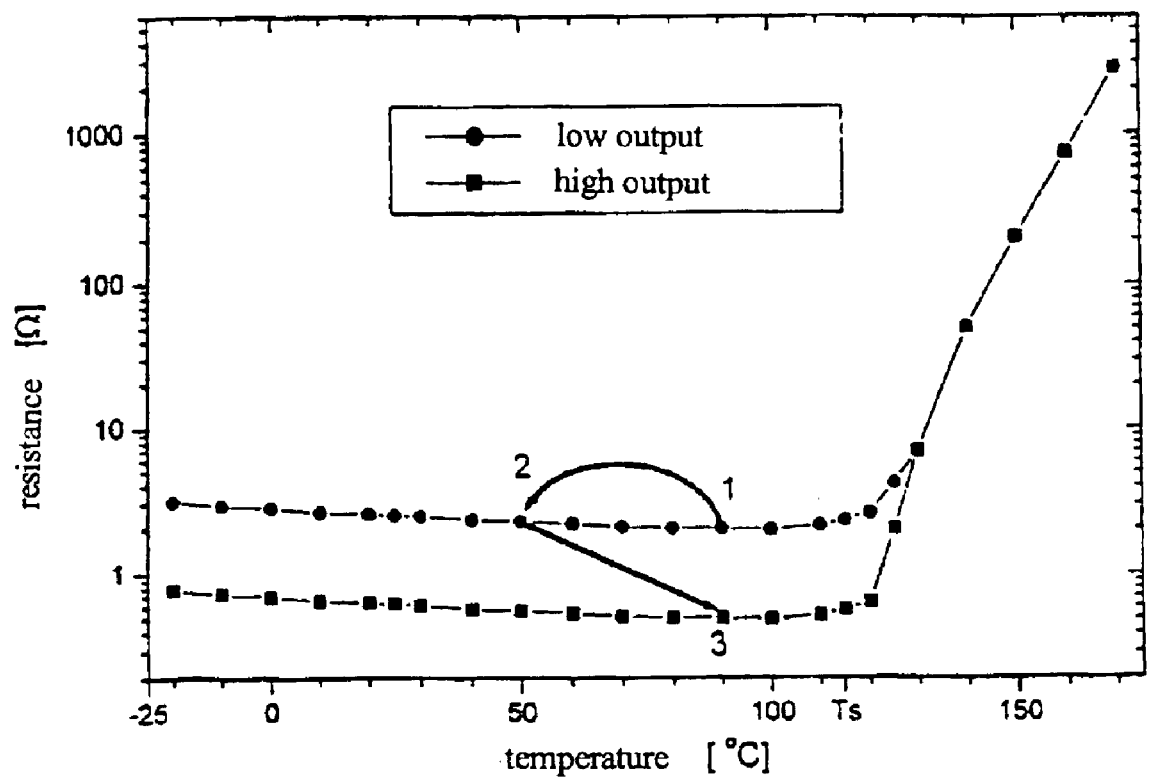

HEATER FOR A MOTOR AIR CONDITIONING SYSTEM COMPRISING AT LEAST ONE HEAT PIPE

The invention relates to a heater for a motor vehicle air conditioning system with at least one heat exchanger tube which produces a treat conducting connection between a heat generating means with a heating element and at least one heat releasing means via a medium which vaporizes and condenses in the heat exchanger tube. Furthermore, the invention relates to an air conditioning system for a vehicle with one such heater, a motor vehicle with one such air conditioning system, and a process for producing a heater for one such motor vehicle air conditioning system.

Heaters of the initially mentioned type are used in motor vehicle air conditioning systems in order to be able to heat a liquid or gaseous heat transfer medium independently of the internal combustion engine of the motor vehicle. With the heated heat transfer medium, for example ambient air, the passenger compartment of the motor vehicle can be heated up relatively quickly and especially the windows the vehicle can be defrosted. These are so-called defrosters.

In an electrical heater, as is known from EP 0 243 077 A2, in its heat exchanger there are PTC heating elements and radiator elements with ribs arranged in layers. The PTC heating elements heat the radiator elements in their immediate vicinity through which ambient air flows. On one edge of the heater electrical contact-making for the PTC heating elements is formed.

These heaters automatically limit their output when a certain threshold temperature is reached by the rise of the resistance of the PTC heating elements.

If a high enough voltage is applied to the PTC ceramic so that the ceramic is heated up by the current flow, an equilibrium state occurs between the supplied electrical power and the delivered thermal power. The ceramic cannot assume just any high temperatures. The resistance increases in super proportion due to the special resistance temperature characteristic of the PTC ceramic and the electrical current and output are limited.

The described property of the PTC ceramic can be ideally used for heating applications. PTC heating elements can be used as self-regulating dynamic heating elements. Therefore with PTC heating elements the requirement of the vehicle manufacturer can be satisfied that the electrical heater with the outlet flaps closed and with full heat output due to the danger of melting and fire may not exceed a threshold temperature from roughly 150° C. to 165° C.

Known electrical heaters however have disadvantages with respect to their construction. Thus, long electrical feed lines for high currents are necessary for the PTC heating elements which are distributed in the heat exchanger of the heater. The division of the heat output in the form of the PTC heating elements results furthermore in the problem that the heat output cannot be optionally distributed uniformly over the heat exchanger of the heater. Rather, unoccupied PTC locations, as necessarily form due to the high resistance tolerance of +/−35% of the PTC heating elements, lead to cold spots on the surface of the heater. These cold spots can be pulled as cold air plumes through the air channels of the air conditioning system Integration of the PTC heating elements into the heat exchanger also leads to the heat exchanger being not homogeneous, but being composed of several materials. These materials, for example aluminum, plastic and ceramic, can only be separated from the heat exchanger and recycled with difficulty after the service life of the heater has expired.

Furthermore the use of PTC heating elements leads to high specific heating costs. PTC ceramic is an expensive material with high specific weight. For reliable contact-making complex mechanical structures in the form of steel frames or the like are necessary on the edge of the heater.

Electrical headers are also known in which heating elements are electronically controlled. For control purposes, control transistors with a strength of the control currents of roughly 70 to 140 amperes are used. These control transistors produce exhaust heat of roughly 70 watts which is advantageously also fed into the heat exchanger of the heater. But the delivery of heat requires high structural effort. Therefore, in general control transistors are used which have a power loss as low as possible. The control currents of high intensity must be switched with repetition rates of for example 30 Hz and 100 Hz. This leads to considerable problems with respect to the electromagnetic compatibility of the heater within the vehicle.

A generic heater is known from Patent Abstracts of Japan 6365752 A. There a fluid heater is described in which heat can be transported to ribs in a heat accumulator and to ribs in a flow heat exchanger with the heat pipe of the PTC heating element. The PTC heating element is used as a heat generating means from which the heat is transported to the ribs as the heat releasing means via the heat pipe. The object is to store heat in a heat accumulator over a long interval by special techniques. In the latter heater there is the problem that it is relatively expensive to produce. In particular the configuration of the heat generating means is complex.

DE 197 43 427 A1 discloses a heat exchanger which is made in the classical execution without a heat exchanger tube, with a plurality of flat tubes which are arranged parallel to one another for guiding a cooling medium. The ends of the flat tubes are bent, are placed tightly against one another and are each connected to a connecting pipe piece which is used as the collecting pipe for the cooling medium. The collecting pipe is made in an extrusion process as a profile pipe section. The object is to form a fluid-tight connection between the flat tubes and the collecting pipe here. Heat is conversely not routed via the connection between the flat tube and the collecting pipe.

DE 31 43 334 C2 discloses a heat exchanger with a bundle of parallel running pipes which are exposed transversely to air, the pipes being positioned in the manner of heat exchanger tubes between two heat exchanger heads. Within the individual heat exchanger head between two adjacent pipes there is one heat exchanger plate which is made as an extruded profile in the form of a double web plate with several channels which run parallel next to one another. The heat exchanger plates extend transversely to the lengthwise direction of the respective heat exchanger head. On the lengthwise sides of each heat exchanger head there are lengthwise channels which are connected to the channels of the transversely extending heat exchanger plates to carry liquid.

DE 40 14 510 A1 discloses a motor vehicle heating system and a process for its operation in which a heat exchanger tube is used as a connection between a burner as the heat generating means and a heat exchanger as the heat releasing means.

DE 199 11 547 A1 discloses an electrical heating means for a motor vehicle which is composed of several heating elements which are arranged parallel and which have PTC heating elements, and of corrugated ribs which adjoin the heating elements in a heat conducting connection.

The object of the invention is to make a generic heater such that it can be economically produced. In this way the total production costs of the pertinent air conditioning system of a motor vehicle will be reduced.

This object is achieved as claimed in the invention with the initially mentioned heater in which the heat generating means is made with an extruded profile to which at least one heat exchanger tube is coupled by heat conduction. Furthermore the object is achieved with an air conditioning system for a motor vehicle in which one such heater as claimed in the invention is incorporated and with a motor vehicle which has one such air conditioning system as claimed in the invention. In addition, a process with the steps of producing a heat conducting connection between at least one heat exchanger tube and an extruded profile, with an opening in its lengthwise direction, and insertion of at least one heat conductor or a PTC heating element into the opening, creates one approach to the object.

The heat generating means of the heater as claimed in the invention is provided with a housing which is produced as an elongated extruded profile. The extruded, profiles can be economically produced, meet high dimensional requirements and enable great freedom in the configuration of the profile cross sections. In addition, for extrusion purposes, in particular aluminum alloys can be used which have high thermal conductivity. The extruded profile as claimed in the invention leads to an especially uniform heat distribution on the heat generating means. In a heater with several heat exchanger tubes they are therefore uniformly heated and formation of cold plumes on the heat releasing means of the heater is thus avoided.

For the profile as claimed in the invention it is especially feasible in two areas if it is produced by extrusion.

The first area is where the heating element, for example a heat conductor, can be located within the heat generating means. This first area extends over almost the entire length of the extruded profile. In the extruded profile elongated cavities can be formed especially advantageously. One such cavity can be used in the extruded profile as claimed in the invention in order to insert and fix the heat conductor in it, for example. Fixing can take place with a heat conducting mass which is added to the cavity between the extruded profile and the heat conductor. In addition, the extruded profile can be pressed. All these arrangements create a combination of the housing and heating elements which can be produced easily and economically as a heat generating means.

The second area is the interface between the heat generating means and the heat exchanger tube. This interface must conduct heat especially well. This second area as claimed in the invention can be made on an extruded profile by transverse openings which can be famed easily and moreover precisely in the profile. These openings can be punched or drilled for example in the extruded profile. The material of the extruded profile can be soldered or pressed with the heat exchanger tubes located in the transverse openings in an economical and moreover controlled manner. Alternatively the heat exchanger tubes can also be inserted in a lengthwise groove of the extruded profile. A combination of the transverse opening and lengthwise groove is also conceivable. In any case an extruded profile with this shape can be produced easily, economically and moreover with high dimensional accuracy.

In addition, on the extruded profile there can very easily also be so-called function surfaces for mounting of electronic components. These function surfaces can be formed on the extruded profiles especially well for mounting of transistors.

Furthermore, extruded profiles can be formed with the same tool almost without added costs in different lengths. There can be systematically or modularly different lengths by which different heater types can be produced using only one tool.

For known heat exchangers with a liquid heat transfer medium which have no heat exchanger tubes, to some extent extruded profiles have been used, because with them a fluid-tight connection was formed. As claimed in the invention between the heating element and the heat exchanger tube there is no fluid-conducting connection. Heat must be transported as claimed in the invention.

The main idea of the invention is therefore that several problems can be solved at the same time with an extruded profile. One of the problems is the question of how the heating element can be coupled, a second problem is the mounting of the heat exchanger tubes. In addition, the extruded profile forms the foundation for advantageous developments and different heater types which can be produced especially economically.

The approach as claimed in the invention can be effectively used in heaters with a high power density at the interface between the heat generating means and the heat exchanger tube. As a result of the good thermal conductivity of the extruded profile used, a comparatively small temperature gradient in heat conduction can be achieved in this area. Therefore the heat generating means as claimed in the invention reacts for example especially quickly when the heat releasing means is dammed, by its slowing down.

In one advantageous development of the invention, in the extruded profile in its transverse direction at least one first opening is formed for holding one end of the heat exchanger tube. As mentioned above, these openings can be produced economically. The end of the heat exchanger tube is encompassed in this configuration by the extruded profile and a comparatively large heat transfer surface is formed. Alternatively, the heat exchanger tube with its end or its base can be soldered onto the heat generating means.

The aforementioned heat conducting connection between the extruded profile and the heat exchanger tube can be formed especially advantageously by soldering. When soldering, a plurality of heat exchanger tubes can be coupled to the extruded profile in one process. In addition, cavities and gaps between the heat exchanger tube and the extruded profile are filled in soldering and thus good thermal conductivity of the connection is formed.

Alternatively or additionally, the heat conductive connection between the extruded profile and the heat exchanger tube can be formed by caulking. Caulking offers especially the advantage that high temperatures do not form and accordingly the heat generating means cannot be damaged by high heating. A caulking process is furthermore generally very economical, and especially for production of large numbers, it is the process of choice.

In the extruded profile in its lengthwise direction a second opening is advantageously formed for accommodating at least one PTC heating element or one heat conductor. The second opening can, as mentioned above, be made with great freedom of configuration and therefore can be exactly matched to the shape required for one or more PTC heating elements or a heat conductor.

One PTC heating element can be pushed into the opening and fixed in it by pressing the extruded profile towards the PTC heating element and optionally electrical contact can be made with it.

On the extruded profile as claimed in the invention there is furthermore advantageously at least one function surface for the mechanical, electrical or heat conducting connection of at least one PTC heating element or at least one heat conductor. One such function surface as claimed in the invention is a free by-product of the extrusion process. A means which is to be located in the heat generating means can be thermally linked using the function surface, electrical contact can be made with it, and moreover it can be mechanically fixed. A function surface can be provided using an extrusion process with an especially smooth surface which is advantageous especially for thermal and electrical contact-making. On one such function surface, besides a PTC heating element or a heat conductor, an electrical controller, for example in the form of a control transistor, can be mounted.

The indicated second opening can moreover be made as a slot into which especially at least one PTC heating element is pushed in the transverse direction of the extruded profile. Alternatively, heating elements can also be pushed axially into the extruded profile. Generally, in the heater of a motor vehicle air conditioning system there can be a majority up to a plurality of PTC heating elements. This takes place in the described development by simply inserting the individual PTC heating element radially into an axially pointed slot. The resulting short insertion path and high dimensional accuracy on the slot enable economical and moreover controlled production of the heater which has been developed in this way.

At least one PTC heating element is furthermore advantageously held in the slot by elastic pretensioning of the extruded profile. The PTC heating element is pinched in the slot and is mechanically fixed by clamping. Moreover, between the clamped faces of the PTC heating elements and the material of the extruded profile, outstanding heat transfer is formed. The clamping can be produced by elastic expansion of the extruded profile itself. Alternatively or additionally there can specially be one spring element in order to ensure damping over the service life of the heater.

Embodiments of the motor vehicle air conditioning system am detailed below using the attached schematics.

FIG. 1 shows a cross section of an air conditioning system as claimed in the invention, FIG. 2 shows a perspective view of the heater of the air conditioning system as shown in FIG. 1, FIG. 3 shows a side view of one segment of a partially cutaway heat pipe of the heater as shown in FIG. 2, FIG. 4 shows a perspective view of a first embodiment of an extruded profile of a heat generating means as claimed in the invention on the heater as shown at FIG. 2, FIG. 5 shows a perspective view of a second embodiment of an extruded profile of a heat generating means as claimed in the invention on the heater as shown in FIG. 2, FIG. 6 shows a cross section of a third embodiment of an extruded profile of a heat generating means as claimed in the invention on the heater as shown in FIG. 2, FIG. 7 shows a cross section of a fourth embodiment of an extruded profile of a heat generating means as claimed in the invention on the heater as shown in FIG. 2, and FIG. 8 shows a diagram which illustrates the relationship between the resistance and temperature of a PTC ceramic.

FIG. 1 shows an air conditioning system 10 for a motor vehicle 12 in the form of a passenger car. The air conditioning system 10 is installed in the area of the dashboard 14 of the motor vehicle 12, it has an air inlet 16 which is located between the hood 18 and the windshield 20 of the vehicle 12. Underneath the air inlet 16 is a fan 22 which delivers air from the vicinity of the motor vehicle 12 into the air conditioning box 24. The air conditioning box 24 is a space which is located underneath the windshield 20 and in which there are two heat exchangers 26, 28 and a heater 30 in succession.

Air which has been conveyed by the fan 22 through the heat exchanger 26, 28 and the heater 30 and which has been optionally heated, then travels into diverse air channels 32, 34, and 36 which are made in the dashboard 14. The air travels through the air channels 32, 34, 36 to the outlet flaps 38, 40 and 42 and finally through air outlets 44, 46, and 48 into the passenger compartment 50.

The heat exchangers 26 add 28 are designed for liquid heat transfer media, for example the coolant of an internal combustion engine of the motor vehicle 12, which engine is not shown. The liquid heat transfer media are delivered by the heating or cooling system of the motor vehicle 12 which is not shown through the heat exchangers 26 and 28.

The heater 30 is made as an electrical heater using which air from the vicinity of the vehicle 12 is to be heated if enough heat energy cannot be made available by the remaining heating system of the vehicle 12. This is the case for example when the coolant of the internal combustion engine is cold immediately after the engine stalls. Furthermore an electrical heater can be efficient or necessary when the motor vehicle 12 is provided with consumption-optimized internal combustion engine which delivers relatively little exhaust heat.

FIG. 2 illustrates the basic structure of the electrical heater 30 as claimed in the invention.

The heater 30 has a single, essentially closed heat generating means 52 which is connected to the heat conducting means 54 in the form of heat exchanger tubes. The heat exchanger tubes 58 are connected by thermal conduction to the heat releasing means 56 in the form of a plurality of ribs and form with them the heat exchanger of the heater 30.

The individual means 52, 54, 56 within the heater 30 form individual modules which can be combined and matched individually to the ribs depending on the required heat output and desired flow and space conditions. For the heat exchanger tubes 58 in combination with the ribs a conventional heat exchanger can be used, as is used for example in water-air heat exchangers. The ribs can also extend between two heat exchanger tubes 58 at a time as corrugated or zig-zag sheets. One such heat exchanger which is economical to produce is known for example from EP 0 775 884 A3. The heat exchanger tubes 58 are round tubes. A configuration as flat tubes is also advantageous. The aforementioned zig-zag ribs can also be coupled especially well to these flat tubes.

The heat generating means 52 is located as claimed in the invention on one edge of the heater 30. From it several heat exchanger tubes 58 project vertically and through the plurality of ribs 56 which generally extend spaced parallel to the heat generating means 52. The heat pipes 58 therefore pass through the ribs 56 essentially vertically.

Connections which are especially heat conductive are formed between the heat generating means 52 and the heat exchanger tubes 58 and between the heat exchanger tubes 58 and the heat releasing ribs 56.

The heat tubes 58 provided as claimed in the invention make it possible for the heating elements of the heater 30 to be concentrated on one edge or at least in one area of its heat exchanger. The generated heat can be distributed uniformly as claimed in the invention over the entire surface of the heat exchanger by means of the heat exchanger tubes 58 without formation of cold air plumes.

FIG. 3 illustrates the operation of a heat exchanger tube 58 as a heat conducting means 54 within the heater 30. One such heat exchanger tube is also called a heat pipe.

In the heat exchanger tube 58 which is shown in sections in FIG. 3 the heat is transported from bottom to top. In the bottom area of the heat exchanger tube 58 is the heat generating means 52 as the heat source. The liquid which is located in the heat exchanger tube 58 is vaporized by it. The liquid can be for example high-purity water. The vaporized liquid rises at high speed as steam in the heat exchanger tube 58. This is illustrated with the arrow A.

The steam travels to points of a hollow cylindrical wall 60 of the heat exchanger tube 58 at which comparatively low temperatures prevail because the heat exchanger tube 58 has been cooled there for example by heat conduction on one rib (arrow B). At the colder locations the steam condenses. The liquified steam flows as a liquid to the bottom area of the heat exchanger tube 58 and back to the heat source located there (arrow C). With re-vaporization of the liquid the described cycle of heat transport begins again.

The steam condenses on the heat exchanger tube 58 exactly where the colder locations of the wall 60 are located, therefore at the locations where there is a heat demand. The wall 60 of the heat exchanger tube 58 is therefore almost homogeneously heated. A noticeable temperature drop as is known in heat conduction in a solid generally cannot be noted. Large amounts of heat can be transported by the phase transition between liquid and gas. The heat transport capacity of one such heat exchanger tube 58 compared to solids with similar dimensions is roughly 10 to 100 times higher.

The condensed liquid can be returned to the heat source also by capillary action in for example a fine network on the inside of the heat exchanger tube 58. The heat exchanger tube 58 can also be operated horizontally.

FIG. 4 shows a first embodiment of a heat generating means 52 as is used for the heater 30 as claimed in the invention.

The heat generating means 52 has an extruded profile 62 of aluminum alloy with an essentially cylindrical base body in which in the lengthwise direction of the extruded profile 62 a cylindrical lengthwise opening 64 and transversely to this three cylindrical transverse openings 66 are formed.

In the transverse openings 66 with the heater 30 mounted the bottom ends of the heat exchanger tubes 58 are inserted and caulked or soldered there to conduct heat.

The lengthwise opening 64 is used for accommodating an electrical heating element in the form of a heating rod 68. The heating rod 68 is provided with a cylindrical pipe jacket 70 with a diameter which is matched to the diameter of the lengthwise opening 64. In the pipe jacket 70 them is an insulating mass 72. On the ends the pipe jacket 70 is sealed by ceramic end sleeves 74 on which one electrical terminal 76 at a time is located with a terminal bolt 28. Between the terminal bolts 78 a heat conductor 80 is routed through the ceramic end sleeves 74 and the insulating mass 72. In an embodiment which is not shown the pipe jacket 70 is omitted and the heat conductor 80 and the insulating mass 72 are inserted directly into the lengthwise opening 64 and fixed in it.

Using the heat conductor 80, in the operation of the heater 30 with the heating rod 68 the extruded profile 62 can be heated. The extruded profile 62 transfers the heat directly to the embedded ends of the heat exchanger tubes 58. The latter route the heat uniformly and quickly to the ribs which are used as heat releasing means 56.

On the extruded profile 62, finally a flattened area 82 is formed as a so-called "function surface" by which the extruded profile 62 and optionally the heat exchanger tubes 58 which are attached to it with their ribs can be mounted directly on one component of the vehicle 12 or in an outside housing of the heater 30, which housing is not shown. The flattened area can also be used for mounting a control transistor with which the heat output of the heat conductor 80 is electrically controlled.

FIG. 5 shows a second embodiment of the heat generating means 52 with an extruded profile 84 which is used to accommodate the PTC heating elements 86.

The extruded profile 84 is made as a cylindrical base body in which a lengthwise slot 88 and transversely to it three cross openings 90 are formed. The cross openings 90 are used in turn to accommodate the ends of the heat exchanger tubes 58.

When the heater 30 is installed, the PTC heating elements 86 are pinched in the lengthwise slot 88. The extruded profile 84 in the area of the lengthwise slot 88 is elastically widened for clamping, the PTC heating elements 86 are pushed in and the lengthwise slot 88 is allowed to elastically taper again.

Thus, between the extruded profile 84 and the PTC heating elements 86 a highly heat conductive connection which is moreover stilted for electrical contact-making is formed. Function surfaces which are not shown are made in the lengthwise slot 88 for this purpose. The PTC heating elements 86 make contact using a contact foil 92 which adjoins one side of the PTC heating element 86 in the lengthwise slot 88 and is electrically insulated against the extruded profile 84 using an insulating foil 94.

FIG. 6 shows another embodiment of a heat generating means 52. In this embodiment in the extruded profile 84, as explained above, at least one cross opening 90 for accommodating one end of the heat exchanger tube 58 is formed.

Furthermore, in the extruded profile 84 a slot-shaped opening 96 is formed as a lengthwise opening and is located in the lengthwise direction of the heat exchanger tube 58 underneath its end. The PTC heating elements 86 are inserted in the opening 96 using a contact foil 92 and an insulating foil 94, as explained above.

On the sides of the extruded profile 84 two flattened areas 98 and 100 are formed, on which the extruded profile 84 has been caulked or pressed in the direction to the PTC heating elements 86. By this pressing the PTC heating elements 86 are fixed mechanically to conduct heat in the opening 96 and electrical contact-making on the contact foil 92 is formed.

FIG. 7 shows one embodiment of a heat generating means 52 in which in the extruded profile 84 underneath and next to the heat exchanger tubes 58 two openings 96 are made for accommodating the PTC heating elements 86. In this arrangement especially good heat release from the PTC heating elements 86 to the ends of the heat exchanger tubes 58 is formed. The PTC heating elements 86 are inserted aligned in the openings 96 such that their surfaces which are in direct contact with the extruded profile 84 are pointed toward the lengthwise axis of the heat pipe 58. In one embodiment which is not shown, the indicated surfaces are each aligned to the end of the heat exchanger tube 58. The openings 96 are therefore arranged in a V shape. In addition, the end of the heat exchanger tube 58 can be pressed flat and sealed. The transverse opening 90 can be matched on its base to the shape of the flat-pressed heat exchanger tube 58. It is likewise V shaped in this area in cross section.

On the sides of the extruded profile 84 analogously to the embodiment shown hi FIG. 6 flat areas 98 and 100 we made. The extruded profile 84 is made stable in the area between the openings 96 such that essentially it is not deformed during the pressing of the PTC heating elements 86 in this area.

Alternatively, the extruded profile 84 can be made deformable in a controlled manner in the area between the two openings 96. The deformation process can be used to compress and seal at least one end of the heat pipe 58 which has been inserted into the cross opening 90 before pressing.

The PTC heating elements 86 in the electrical heater 30 are components which cause high costs as a result of their complex production and their more expensive material. Therefore efforts are made to operate the PTC heating element 86 with maximum output P. At a constant supply voltage, due to $P=U^2/R$, it means that the minimum resistance should be triggered on the resistance characteristic of the PTC heating elements 86.

The initially described equilibrium state between the resistance and temperature on the PTC heating elements 86 and also the temperature of the ceramic which has been reached there depend largely on the heat release to the vicinity. High heat outputs can be achieved only with a favorable heat conducting means 54 and thus an optimized and long-lived heater with PTC ceramic can be formed.

The combination of PTC heating elements 86 with heat exchanger tubes 58 as claimed in the invention leads to stronger release of heat from the PTC heating elements 86 than in the technologies used in the past. As a result of the better heat conduction the temperature difference between the PTC heating elements 86 and the heat releasing means 56 of the heater 30 decreases. The PTC heating elements 86 cool off. The associated increase of resistance allows the electrical output to drop with a new equilibrium state is reached (see point 1 to point 2 in FIG. 8). The PTC heating elements 86 would therefore work basically at a lower temperature. However a PTC ceramic with an especially low electrical resistance can be used. In this way the output of the PTC heating elements 86 is increased and thus the temperature rises again to the optimum operating point 86 (see point 2 to point 3 in FIG. 8). At the optimum operating point the PTC heating elements 86 are located in the vicinity of the point of lowest resistance of the PTC ceramic.

This means that the PTC heating elements 86 have the lowest inherent weight per delivered output. The use of heat exchanger tubes 58 as claimed in the invention therefore offers the possibility of significantly reducing the number and weight of the PTC heating elements 86 together with contact-making at a constant heat output. The heat output can be greatly increased relative to the costs of the PTC heating elements 86. Moreover the heat generating means 52 can be made especially compact.

Reference Number List 10 air conditioning system
12 motor vehicle
14 dashboard
16 air inlet
18 hood
20 windshield
22 fan
24 air conditioning box
26 heat exchanger
28 heat exchanger
30 electrical heater
32 air channel
34 air channel
36 air channel
38 outlet flap
40 outlet flap
42 outlet flap
144 air outlet
46 air outlet
48 air outlet
50 passenger compartment
52 heat generating means
54 heat conducting means
56 heat releasing means
58 heat exchanger tube
60 wall
62 extruded profile
64 lengthwise opening
66 transverse opening
68 heating rod
70 pipe jacket
72 insulating mass
74 end sleeve
76 terminal
78 terminal bolt
80 heat conductor
82 flattened area
84 extruded profile
86 PTC heating element
88 lengthwise slot
90 transverse opening
92 contact foil
94 insulating foil
96 opening
98 flattened area
100 flattened area

What is claimed is:

1. Heater for a motor vehicle air conditioning system, said heater comprising at least one heat exchanger tube which produces a heat conducting connection between a heat generating means with a heating element and at least one heat releasing means via a medium which vaporizes and condenses in the heat exchanger tube, the heat generating means comprising an extruded profile coupled to at least one heat exchanger tube by a heat conducting connection; and
   wherein at least one first opening is formed in the extruded profile in a transverse direction for holding an end of the at least one heat exchanger tube.

2. Heater as claimed in claim 1, wherein the heat conducting connection is formed between the extruded profile and at least one heat exchanger tube by soldering.

3. Heater as claimed in claim 1, wherein the heat conducting connection is formed between the extruded profile and the at least one heat exchanger tube by caulking.

4. Heater as claimed in claim 1, wherein a second opening is formed in the extruded profile in its lengthwise direction for accommodating at least one heat conductor or at least one PTC heating element.

5. Heater as claimed in claim 4, wherein at least one function surface is provided on the extruded profile for the mechanical, electrical or heat conducting connection of at least one heat conductor or at least one PTC heating element.

6. Heater as claimed in claim 5, wherein said at least one function surface is provided in the area of the second opening.

7. Heater as claimed in claim 6, wherein the second opening is a slot into which said at least one heat conductor or at least one PTC heating element has been inserted in transverse direction of the extruded profile.

8. Heater as claimed in claim 7, wherein at least one PTC heating element is held in the slot by elastic pre-tensioning of the extruded profile.

9. Air conditioning system for a motor vehicle comprising a fan which delivers air into an air conditioning box having a space in which is located two heat exchangers and a heater in succession, the heater having at least one heat exchanger tube which produces a heat conducting connection between a heat generating means with a heating element and at least one heat releasing means via a medium which vaporizes and condenses in the heat exchanger tube, the heat generating means comprising an extruded profile coupled to at least one heat exchanger tube by a heat conducting connection; and
  wherein at least one first opening is formed in the extruded profile in a transverse direction for holding an end of the at least one heat exchanger tube.

10. Air conditioning system as claimed in claim 9, wherein a second opening is formed in the extruded profile in its lengthwise direction for accommodating at least one heat conductor or at least one PTC heating element.

11. Air conditioning system as claimed in claim 10, wherein at least one function surface is provided on the extruded profile for the mechanical, electrical or heat conducting connection of at least one heat conductor or at least one PTC heating element.

12. Air conditioning system as claimed in claim 11, wherein said at least one function surface is provided in the area of the second opening.

13. Air conditioning system as claimed in claim 12, wherein the second opening is a slot into which said at least one heat conductor or at least one PTC heating element has been inserted in the transverse direction of the extruded profile.

14. Motor vehicle with an air conditioning system comprising air inlet which is located between a hood and a windshield of the vehicle, a fan which delivers air from said air inlet into an air conditioning box having a space in which is located two heat exchangers and a heater in succession, the heater having at least one heat exchanger tube which produces a heat conducting connection between a heat generating means with a heating element and at least one heat releasing means via a medium which vaporizes and condenses in the heat exchanger tube, the heat generating means comprising an extruded profile coupled to at least one heat exchanger tube by a heat conducting connection; and
  wherein at least one first opening is formed in the extruded profile in a transverse direction for holding an end of the at least one heat exchanger tube.

15. Motor vehicle as claimed in claim 14, wherein a second opening is formed in the extruded profile in its lengthwise direction for accommodating at least one heat conductor or at least one PTC heating element.

16. Motor vehicle as claimed in claim 15, wherein at least one function surface is provided on the extruded profile for the mechanical, electrical or heat conducting connection of at least one heat conductor or at least one PTC heating element.

17. Motor vehicle as claimed in claim 16, wherein said at least one function surface is provided in the area of the second opening.

18. Motor vehicle as claimed in claim 17, wherein the second opening is a slot into which said at least one heat conductor or at least one PTC heating element has been inserted in the transverse direction of the extruded profile.

19. Heater for a motor vehicle air conditioning system, said heater comprising at least one heat exchanger tube which produces a heat conducting connection between a heat generating means with a heating element and at least one heat releasing means via a medium which vaporizes and condenses in the heat exchanger tube, the heat generating means comprising an extruded profile couplet to at least one heat exchanger tube by a heat conducting connection;
  wherein an opening is formed in the extruded profile in its lengthwise direction for accommodating;
  wherein the opening is a slot into which said PTC heating element has been inserted in the transverse direction of the extruded profile, and
  wherein the at least one PTC heating element is held in the slot by elastic pre-tensioning of the extruded profile.

20. Heater as claimed in claim 19, wherein at least one additional opening is formed in the extruded profile in a transverse direction for holding an end of the at least one heat exchanger tube.

21. Heater as claimed in claim 20, wherein the heat conducting connection is formed between the extruded profile and at least one heat exchanger tube by soldering.

22. Heater as claimed in claim 20 wherein the heat conducting connection is formed between the extruded profile and the at least one heat exchanger tube by caulking.

23. Heats as claimed in claim 19, wherein at least one function surface is provided on the extruded profile for the mechanical, electrical or heat conducting connection of the at least one PTC heating element.

24. Heater as claimed in claim 23, wherein said at least one function surface is provided in the area of said opening.

25. Air conditioning system for a motor vehicle comprising a fan which delivers air into an air conditioning box having a space in which is located two heat exchangers and a heater in succession, the heater having at least one heat exchanger tube which produces a heat conducting connection between a heat generating means with a heating dement and at least one heat releasing means via a medium which vaporizes and condenses in the heat exchanger tube, the heat generating means comprising an extruded profile coupled to at least one heat exchanger tube by a heat conducting connection;
  wherein an opening is formed in the extruded profile in its lengthwise direction for accommodating at least one PTC heating element;
  wherein the opening is a slot into which said at least one PTC heating element has been inserted in the transverse direction of the extruded profile; and
  wherein the at least one PTC heating element is held in the slot by elastic pre-tensioning of the extruded profile.

26. Air conditioning system as claimed in claim 25, wherein at least one first opening is formed in the extruded profile in a transverse direction for holding an end of the at least one heat exchanger tube.

27. Air conditioning system as claimed in claim 25, wherein at least one function surface is provided on the extruded profile for the mechanical, electrical or heat conducting connection of at least one PTC heating element.

28. Air conditioning system as claimed in claim 27, wherein said at least one function surface is provided in the area of said opening.

29. Motor vehicle with an air conditioning system comprising air inlet which is located between a hood and a windshield of the vehicle, a fan which delivers air from said air inlet into an air conditioning box having a space in which is located two heat exchanges and a heater in succession, the heater having at least one heat exchanger tube which produces a heat conducting connection between a heat generating means with a heating element and at least one heat releasing means via a medium which vaporizers and condenses in the heat exchanger tube, the heat generating means comprising an extruded profile coupled to at least one heat exchanger tube by a heat conducting connection;
  wherein an opening is formed in the extruded profile in its lengthwise direction for accommodating at least one PTC heating element;
  wherein the opening is a slot into which said at least one PTC hating element has been inserted in the transverse direction of the extruded profile; and wherein the at least one PCT heating element is held in the slot by elastic pre-tensioning of the extruded profile.

30. Motor vehicle as claimed in claim 29, wherein at least one additional opening is formed in the extruded profile in a transverse direction for holding an and of the at least one heat exchanger tube.

31. Motor vehicle as claimed in claim 29, wherein at least one function surface is provided on the extruded profile for the mechanical, electrical or heat conducting connection of at last one heat conductor or at least one PTC heating element.

32. Motor vehicle as claimed in claim 31 wherein said at least one function surface is provided in the area of said opening.

\* \* \* \* \*

UNITED STATES PATENT AND TRADEMARK OFFICE
CERTIFICATE OF CORRECTION

PATENT NO. : 6,880,762 B2
DATED : April 19, 2005
INVENTOR(S) : Frank Erbacher

It is certified that error appears in the above-identified patent and that said Letters Patent is hereby corrected as shown below:

<u>Title page,</u>
Item [75], Inventor, replace with -- Frank Erbacker, Starnberg (DE) --.

Signed and Sealed this

Fourth Day of October, 2005

JON W. DUDAS
*Director of the United States Patent and Trademark Office*